No. 779,731. PATENTED JAN. 10, 1905.
J. NEARY.
VEHICLE TIRE.
APPLICATION FILED MAY 28, 1904.
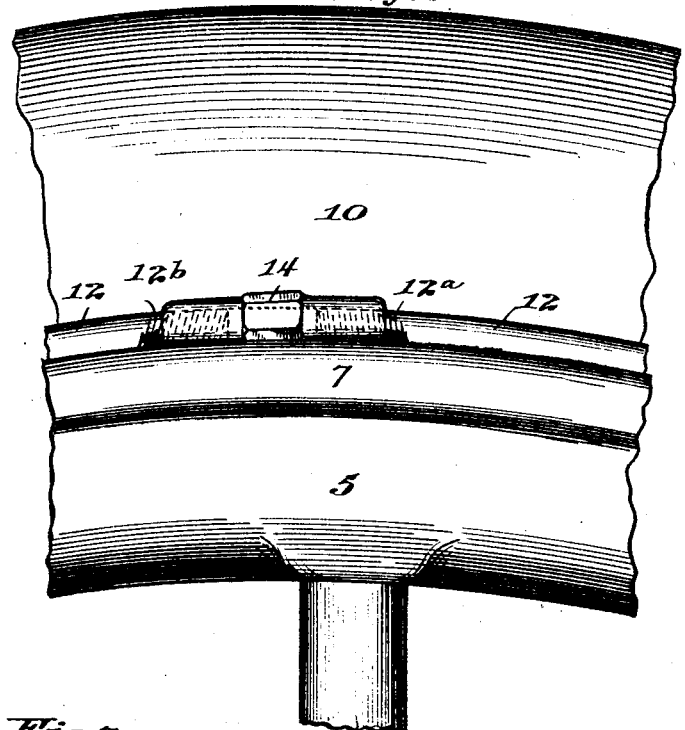
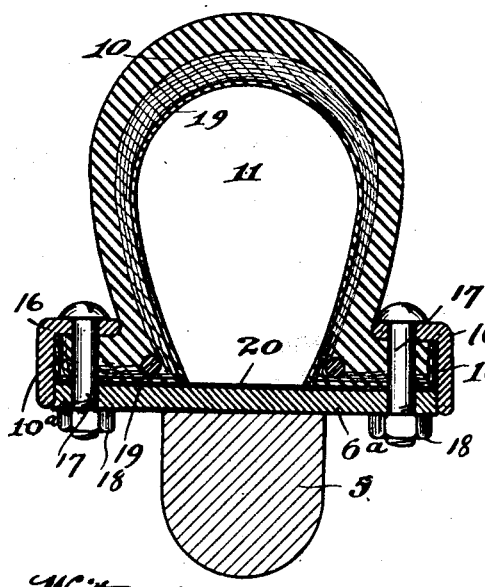
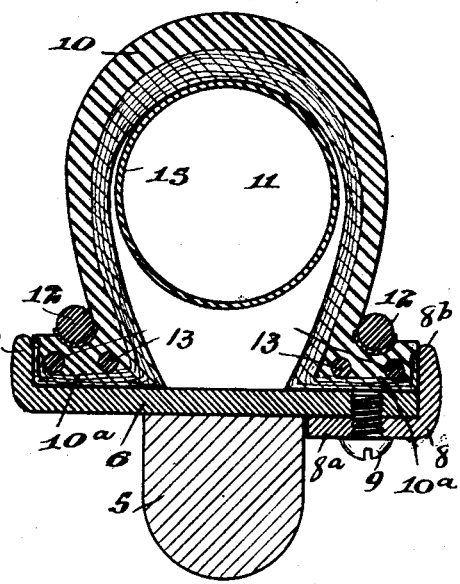
Witnesses,
S. S. Mann,
S. N. Pond.
Inventor,
John Neary.
By Offield, Towle & Linthicum
Attys.

No. 779,731.

Patented January 10, 1905.

UNITED STATES PATENT OFFICE.

JOHN NEARY, OF KOKOMO, INDIANA, ASSIGNOR TO KOKOMO RUBBER COMPANY, OF KOKOMO, INDIANA, A CORPORATION OF INDIANA.

VEHICLE-TIRE.

SPECIFICATION forming part of Letters Patent No. 779,731, dated January 10, 1905.

Application filed May 28, 1904. Serial No. 210,253.

*To all whom it may concern:*

Be it known that I, JOHN NEARY, a citizen of the United States, residing at Kokomo, in the county of Howard and State of Indiana, have invented certain new and useful Improvements in Vehicle-Tires, of which the following is a specification.

My invention relates to vehicle-tires, and has reference more particularly to that class of tires intended for use on heavy vehicles, such as automobiles and other motor-vehicles, which are commonly inflated with air at a high pressure.

The object of the invention is to provide an improved means for fastening the tire to the rim which will permit an easier application of the tire to the rim than by methods now in use and which will also more securely unite the tire to the rim and enable it to withstand lateral strains tending to unseat it.

To this and other minor ends the invention consists in a novel construction of tire, rim, and fastening devices chiefly characterized by the employment on one or both edges of the rim of an annular angle-iron member secured to the base of the rim and rigidly holding the base of the tire-body against lateral displacement under the internal air-pressure as well as under external side thrusts, all as hereinafter described, and more particularly pointed out in the claims.

My invention in two approved mechanical embodiments of the same is illustrated in the accompanying drawings, wherein—

Figure 1 is a side elevational view of a section of the tire and rim, more particularly illustrating the means for uniting the meeting ends of the side fastening-wires. Fig. 2 is a cross-sectional view of the parts shown in Fig. 1; and Fig. 3 is a view similar to Fig. 2, illustrating a modified form of tire-fastening means.

Referring to the drawings, 5 designates the felly, and 6 the base of the rim. This latter in the forms shown in Figs. 1 and 2 is a wide flat band having on one edge an upwardly-turned margin 7, forming a shoulder or abutment for one edge of the base of the tire-body. The corresponding shoulder or abutment on the opposite edge of the rim is secured by means of an annular angle-iron 8, preferably made in several segments, the transversely-extending member of which (designated by $8^a$) is adapted to be secured to the under or inner side of the rim 6, as by screws 9, while its radial member $8^b$ extends upwardly or outwardly of the outer edge of the rim 6 and forms a companion to the abutment 7 to resist the outward thrust of the base of the tire-body.

10 designates as an entirety the tire-body, which is hollow to provide an inner air-space 11 and is longitudinally split along its inner periphery or base, the meeting edges being laterally enlarged and extended, as shown at $10^a$, and squared at their outer margins to secure a broad seat upon the flat rim 6 and form broad shoulders for the application of the external retaining-wires 12. The base portions $10^a$ of the tire may also have embedded therein one or more internal retaining bands or wires 13 on each side, and their outer edges are formed vertical to abut squarely against the vertical flanges 7 and $8^b$ of the rim, as clearly shown in Fig. 2. The meeting ends of the external side wires 12 are provided with right and left hand threads, respectively, as shown at $12^a$ and $12^b$, and are drawn together over the shoulders of the tire by an internally-threaded turnbuckle 14, whereby said wires may readily be placed under ample tension to unite the tire securely to the rim.

15 designates the usual inner air-holding tube.

In applying the tire to the rim the tire-body containing the tube 15 is simply inserted laterally over the free edge of the rim-base 6, the annular channel-iron 8 being removed. As soon as the tire has been seated on the rim against the flange 7 the removable channel-iron flange 8 is applied and secured by the screws 9, after which the external side wires 12 may be applied and drawn up to the required tension by their turnbuckles 14 in an obvious manner. The tire is thus secured rigidly against either lateral or radial displacement and by means of the side wires 12 may be drawn into snug engagement with the base of the rim.

Fig. 3 shows a modification wherein the side wires 12 are dispensed with, and in place thereof annular angle-irons 16 are employed, being applied with their inner angles covering the shouldered base portions $10^a$ of the tire, their horizontal inwardly-extending members being apertured to receive fastening-bolts 17, which extend through the base of the tire and the rim, being drawn up by nuts 18 on their lower ends, while the vertical members of the angle-irons lie outside the outer edges of the base portions of the tire, extending over and flush with the edges of the rim-base $6^a$. In this way the annular angle-irons constitute not only abutments to resist the lateral thrust of the tire-body, but also secure the latter against displacement in a radial direction. This tire is also easily applied by inserting it laterally over the flat rim-base $6^a$, then applying the angle-pieces 16 and adjusting them so that they abut squarely against the outer edges of the rim-base, and then inserting and tightening up the tie-bolts 17. This tire may have the usual inner air-holding tube, or in lieu thereof the inner surface of the tire-shell may have a lining of rubber (shown at 19) extending around and covering also the rim-engaging surface of the base with a coöperating rubber lining on the outer face of the rim $6^a$, as shown at 20, creating an air-tight joint, and the construction shown in Figs. 1 and 2 may also be similarly provided, if desired, in place of using the tube 15. This feature, however, constitutes no part of the present invention, being disclosed and claimed in a companion application filed concurrently herewith, Serial No. 210,252, and its use in either, or both, of the forms shown in Figs. 2 and 3, respectively, as a substitute for the usual inner air-retaining tube is optional.

It is obvious that in the construction shown in Figs. 1 and 2 the removable angle-piece 8 might be duplicated on the other edge of the rim-base in place of the integral flange 7, although the construction shown is simpler, cheaper, and to be preferred. It is also obvious that in the construction shown in Fig. 3 one of the angle members 16 might be made integral with the rim-base $6^a$, although the double construction is easier to make and affords better results and is consequently preferable.

While I have shown and described two mechanical embodiments of my invention, both of which are practical and useful, yet it is to be understood that these are by no means inclusive of all the detail forms and variations which the invention may comprehend, and consequently I do not limit the latter to such details except to the extent indicated in specific claims.

I claim—

1. The combination with a tire-body having a laterally-projecting base portion, and a rim-base formed by a flat annular band constituting a seat for said tire-base, of a lateral abutment for the latter in the form of an annular angle-iron having its vertical portion seated against the edge of the rim-base and constituting an abutment for the outer edge of the lateral base projection, and having its horizontal portion bolted to the rim-base, substantially as described.

2. The combination with a tire-body having a laterally-projecting base portion and a rim-base formed by a flat annular band constituting a seat for said tire-base and laterally coextensive with the latter, of annular angle-irons fitted over the laterally-projecting portions of the base, and fastening-bolts passed through said angle-irons, lateral projections of the base, and the rim, substantially as described.

3. The combination with a tire-body longitudinally divided along its inner periphery and having radially-extending base members on either side of said longitudinal division, and a rim-base formed by a flat annular band constituting a seat for said base members and laterally coextensive with the combined width of the latter, of annular angle-irons fitted over said base members with their radially-extending portions covering the outer edges of said tire-base members and the rim-base and with their transversely-extending portions overlying said tire-base members, and fastening-bolts passed through said angle-irons, the tire-base members and the rim and securely uniting said parts, substantially as described.

JOHN NEARY.

Witnesses:
B. C. LINCOLN,
EDWIN ELLIS.